United States Patent
Nozaki et al.

(10) Patent No.: US 10,197,099 B2
(45) Date of Patent: Feb. 5, 2019

(54) BEARING DEVICE

(71) Applicant: JTEKT CORPORATION, Osaka-shi, Osaka (JP)

(72) Inventors: Mikio Nozaki, Kashihara (JP); Yoshimichi Higashiyama, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/461,027

(22) Filed: Mar. 16, 2017

(65) Prior Publication Data

US 2017/0276177 A1  Sep. 28, 2017

(30) Foreign Application Priority Data

Mar. 25, 2016 (JP) .................................. 2016-061322
Nov. 11, 2016 (JP) .................................. 2016-220204

(51) Int. Cl.
*F16C 19/06* (2006.01)
*F16C 19/16* (2006.01)
*F16C 33/66* (2006.01)
*G01M 13/04* (2006.01)

(52) U.S. Cl.
CPC .......... *F16C 33/6659* (2013.01); *F16C 19/06* (2013.01); *F16C 33/664* (2013.01); *G01M 13/04* (2013.01); *G01M 13/045* (2013.01); *F16C 19/163* (2013.01); *F16C 2233/00* (2013.01)

(58) Field of Classification Search
CPC .......... F16C 33/6607; F16C 33/6625; F16C 33/664; F16C 33/6659; F16C 33/6674; F16C 223/00; G01M 13/04; G01M 13/045
USPC ......................................... 384/448
See application file for complete search history.

(56) References Cited

U.S. PATENT DOCUMENTS

| | | | |
|---|---|---|---|
| 7,293,919 B2 * | 11/2007 | Ueno ................. | F16C 33/6655 384/462 |
| 8,172,462 B2 * | 5/2012 | Suzuki ............... | F16C 33/3806 384/468 |
| 2015/0240872 A1 * | 8/2015 | Ito ....................... | F16C 33/664 384/471 |
| 2016/0084313 A1 | 3/2016 | Oomoto | |

FOREIGN PATENT DOCUMENTS

JP  2014-219078 A  11/2014
JP  2017-026078 A  2/2017

* cited by examiner

*Primary Examiner* — James Pilkington
(74) *Attorney, Agent, or Firm* — Oliff PLC

(57) ABSTRACT

A bearing device includes a bearing portion that includes an inner ring, an outer ring, a plurality of rolling elements that are interposed between the inner ring and the outer ring, and a cage that holds the plurality of rolling elements, one of the inner ring and the outer ring being a rotational ring, and another of the inner ring and the outer ring being a fixed ring; and an oil supply unit that is provided adjacent to the bearing portion in an axial direction. The cage includes a guide portion that is configured to be in sliding contact with a part of the fixed ring via lubricating oil. The oil supply unit includes a vibration sensor configured to detect a vibration of the fixed ring, and a pump configured to supply the lubricating oil to the bearing portion.

8 Claims, 6 Drawing Sheets

(SECOND SIDE IN AXIAL DIRECTION)  (FIRST SIDE IN AXIAL DIRECTION)

(SECOND SIDE IN AXIAL DIRECTION)

(FIRST SIDE IN AXIAL DIRECTION)

(SECOND SIDE IN
AXIAL DIRECTION)

(FIRST SIDE IN
AXIAL DIRECTION)

(SECOND SIDE IN AXIAL DIRECTION)

(FIRST SIDE IN AXIAL DIRECTION)

BEARING DEVICE

INCORPORATION BY REFERENCE

The disclosure of Japanese Patent Application No. 2016-220204 filed on Nov. 11, 2016 including the specification, drawings and abstract is incorporated herein by reference in its entirety.

BACKGROUND

1. Technical Field

The disclosure relates to a bearing device that includes a bearing portion and an oil supply unit that is provided adjacent to the bearing portion in an axial direction.

2. Description of Related Art

In recent years, various machine tools have been required to have a spindle that rotates at higher speed in order to improve machining efficiency and productivity. When the spindle rotates at high speed, lubrication properties are important especially at a bearing portion that supports the spindle. Thus, there is proposed a bearing device including an oil supply unit provided in a spacer that is provided adjacent to a bearing portion in an axial direction (see Japanese Patent Application Publication No. 2014-219078 (JP 2014-219078 A)). The oil supply unit includes a tank that stores lubricating oil, and a pump that discharges the lubricating oil in the tank to an annular space between an inner ring and an outer ring.

The oil supply unit of the bearing device described in Japanese Patent Application Publication No. 2014-219078 (JP 2014-219078 A) further includes a temperature sensor and a control unit (a microcomputer) in addition to the tank and the pump. The oil supply unit is configured such that a detection signal of the temperature sensor is input to the control unit, and the control unit controls the pump to adjust the amount of lubricating oil supplied to the bearing portion.

SUMMARY

The temperature rises when lubricating oil is, for example, exhausted at the bearing portion to cause a poor lubrication state. Therefore, a lubrication state at the bearing portion can be detected by detecting this rise in temperature by the temperature sensor. Also, in the bearing device described in Japanese Patent Application Publication No. 2014-219078 (JP 2014-219078 A), the control unit controls the pump to supply lubricating oil, and thus, the temperature rise can be suppressed.

However, in the case of the bearing device described in Japanese Patent Application Publication No. 2014-219078 (JP 2014-219078 A), the temperature sensor is included in the control unit of the oil supply unit that is attached to the outer ring spacer, and is configured to measure the temperature at the spacer. Therefore, in some cases, the temperature sensor cannot accurately and quickly detect a change in the temperature at the bearing portion. Accordingly, when the temperature has risen as a result of a shortage of oil at the bearing portion, the detection of the temperature rise may be delayed. As a result, seizure or the like may occur at the bearing portion.

The disclosure provides a bearing device that can prevent occurrence of seizure and the like due to a shortage of oil at a bearing portion.

An aspect of the disclosure relates to a bearing device. The bearing device includes a bearing portion that includes an inner ring, an outer ring, a plurality of rolling elements that are interposed between the inner ring and the outer ring, and a cage that holds the plurality of rolling elements, one of the inner ring and the outer ring being a rotational ring, and another of the inner ring and the outer ring being a fixed ring; and an oil supply unit that is provided adjacent to the bearing portion in an axial direction. The cage includes a guide portion that is configured to be in sliding contact with a part of the fixed ring via lubricating oil, and the oil supply unit includes a vibration sensor configured to detect a vibration of the fixed ring, and a pump configured to supply the lubricating oil to the bearing portion.

The bearing device is configured such that the guide portion of the cage is in sliding contact with the part of the fixed ring via the lubricating oil, and the cage is thus positioned by the fixed ring. Accordingly, heat is likely to be generated at a sliding contact portion between the guide portion of the cage and the part of the fixed ring. When a shortage of oil (and an indication of a shortage of oil) occurs due to, for example, exhaustion of the lubricating oil at the sliding contact portion, the state of contact between the guide portion of the cage and the part of the fixed ring changes, and this change appears as the vibration of the fixed ring. Thus, the vibration sensor of the oil supply unit detects the vibration. Thus, a shortage of oil (and an indication of a shortage of oil) can be detected based on the vibration of the fixed ring, and it is possible to prevent occurrence of seizure and the like due to the shortage of oil.

The inventors of the disclosure have found that a spike vibration waveform (a peak waveform) is generated in the fixed ring when a shortage of oil occurs at the part of the fixed ring. Thus, the bearing device may include a control unit that is configured to make a comparison between a level of a detection signal of the vibration sensor and a threshold, and to output a control signal for causing the pump to supply the lubricating oil when the level is higher than the threshold as a result of the comparison. With this configuration, a shortage of oil (and an indication of a shortage of oil) can be detected at an early stage. For example, in the case where the pump is configured to supply the lubricating oil to the bearing portion in a given cycle, a signal for decreasing the given cycle (i.e., a signal for making the given cycle short) may be used as the control signal (i.e., the pump may be configured to supply the lubricating oil to the bearing portion in a given cycle, and the control signal may be a signal for decreasing the given cycle). Alternatively, a signal for increasing the amount of lubricating oil discharged from the pump may be used as the control signal (i.e., the control signal may be a signal for increasing the amount of lubricating oil discharged from the pump).

The oil supply unit may further include a temperature sensor configured to detect a temperature of a portion of the bearing portion other than a sliding contact portion between the part of the fixed ring and the guide portion. When the amount of lubricating oil decreases due to, for example, exhaustion or the like thereof at the bearing portion, the temperature inside the bearing rises. Thus, the temperature sensor detects this rise in the temperature, and accordingly, the decrease in the amount of lubricating oil can be detected. Moreover, the temperature sensor detects the temperature of a portion other than the sliding contact portion. Therefore, in cooperation with the vibration sensor, the temperature sensor can further enhance the reliability in detecting a lubrication state at the bearing portion.

The bearing device may further include a control unit that is configured to determine whether a first detection signal of the vibration sensor fulfills a prescribed first condition, to determine whether a second detection signal of the temperature sensor fulfills a prescribed second condition, and to output a control signal for causing the pump to supply the lubricating oil when one of the prescribed first condition and the prescribed second condition is fulfilled. Thus, the reliability in detecting a lubrication state at the bearing portion can be further enhanced. For example, in the case where the pump is configured to supply the lubricating oil to the bearing portion in a given cycle, a signal for decreasing the given cycle (i.e., a signal for making the given cycle short) may be used as the control signal (i.e., the pump may be configured to supply the lubricating oil to the bearing portion in a given cycle, and the control signal may be a signal for decreasing the given cycle). Alternatively, a signal for increasing the amount of lubricating oil discharged from the pump may be used as the control signal (i.e., the control signal may be a signal for increasing the amount of lubricating oil discharged from the pump). The prescribed first condition may be a condition that a level of the first detection signal is higher than a first threshold; and the prescribed second condition may be a condition that a level of a change in the temperature with time based on the second detection signal is higher than a second threshold.

The guide portion of the cage may be configured to be in sliding contact with the part of the fixed ring on one side in the axial direction, via the lubricating oil; the oil supply unit may be provided on the one side of the bearing portion in the axial direction such that the oil supply unit is adjacent to the bearing portion; and the vibration sensor may be provided closer to the fixed ring than to the rotational ring in a radial direction. With the configuration, the sensitivity in detection of the vibration of the fixed ring by the vibration sensor is enhanced.

The fixed ring may include a raceway with which the plurality of rolling elements are in rolling contact, and a shoulder portion that is located as the part on one side of the raceway in the axial direction; the oil supply unit may include an annular spacer that is provided adjacent to the one side of the fixed ring in the axial direction, the vibration sensor being mounted at the annular spacer; and the spacer may have a contact surface that contacts a lateral surface of the shoulder portion on the one side in the axial direction and presses the lateral surface when pressure in the axial direction is applied to the spacer and the bearing portion. With the configuration, even when the fixed ring and the spacer are separate bodies, the vibration of the fixed ring is accurately transmitted to the spacer through application of pressure, and the sensitivity in detection of the vibration of the fixed ring by the vibration sensor is enhanced.

The oil supply unit may include a spacer that is made of metal, the spacer being provided adjacent to the fixed ring; and the vibration sensor may be attached to the spacer via an attachment portion made of metal, the attachment portion being provided at the spacer. As described previously, the vibration sensor detects the vibration of the fixed ring. Metal exhibits lower vibration damping properties than resin. Therefore, with the configuration of the attachment portion, the vibration that is transmitted from the fixed ring to the vibration sensor is unlikely to be damped, and the accuracy of detection by the vibration sensor can be enhanced.

The disclosure makes it possible to detect a lubrication state at the bearing portion and to prevent occurrence of seizure and the like due to a shortage of oil.

BRIEF DESCRIPTION OF THE DRAWINGS

Features, advantages, and technical and industrial significance of an exemplary embodiment will be described below with reference to the accompanying drawings, in which like numerals denote like elements, and wherein.

DETAILED DESCRIPTION OF EMBODIMENT

Figure 1:
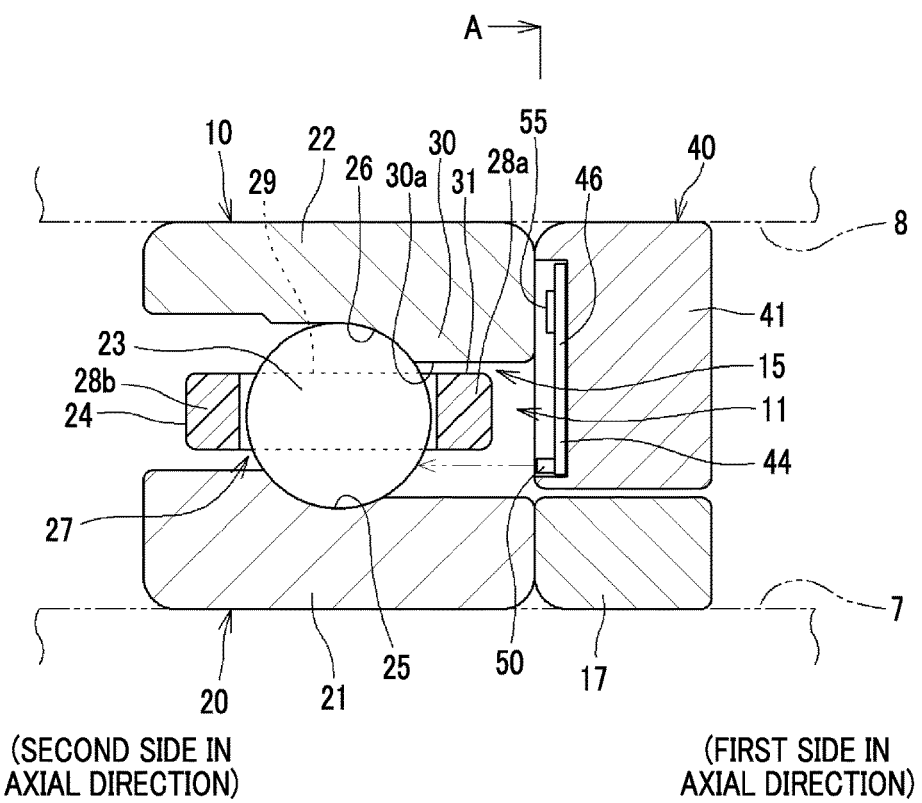
FIG. 1 is a sectional view showing a bearing device according to an embodiment.

A bearing device according to an embodiment of the disclosure will be described hereinafter. FIG. 1 is a sectional view showing the bearing device according to the embodiment of the disclosure. A bearing device 10 shown in FIG. 1 supports a spindle (a shaft 7) of a spindle device that belongs to a machine tool such that the spindle is rotatable, and is accommodated in a bearing housing 8 of the spindle device. In FIG. 1, the shaft 7 and the bearing housing 8 are indicated by alternate long and two short dashes lines. The bearing device 10 is also applicable to devices, machines, and the like other than machine tools. In the following description, a direction parallel to a centerline of the bearing device 10 will be referred to as an axial direction, and a direction orthogonal to the axial direction will be referred to as a radial direction.

The bearing device 10 includes a bearing portion 20 and an oil supply unit 40. The bearing portion 20 includes an inner ring 21, an outer ring 22, a plurality of balls (rolling elements) 23 and a cage 24 that holds the plurality of balls 23, and constitutes a ball bearing (a rolling bearing). Furthermore, the bearing device 10 includes a cylindrical inner ring spacer 17.

The oil supply unit 40 has an annular shape as a whole, and is provided adjacent to the bearing portion 20 in the axial direction. The oil supply unit 40 according to the present embodiment has a function of supplying oil to the bearing portion 20, and also a function of an outer ring spacer. The configuration and functions of the oil supply unit 40 will be described later. Although not shown in the drawings, an annular outer ring spacer made of metal may be provided adjacent to one side (hereinafter, referred to as "first side") of the outer ring 22 in the axial direction, and the oil supply unit may be provided on an inner side of the outer ring spacer in the radial direction.

In the present embodiment, the outer ring 22 and the oil supply unit 40 are attached to the bearing housing 8 such that the outer ring 22 and the oil supply unit 40 are unable to rotate, and the inner ring 21 and the inner ring spacer 17 rotate together with the shaft 7. Accordingly, the outer ring 22 is a fixed ring that does not rotate, and the inner ring 21 is a rotational ring that rotates together with the shaft 7.

The inner ring 21 is a cylindrical member that is fitted to an outer periphery of the shaft 7, and a raceway (hereinafter referred to as an inner ring raceway 25) is provided on an outer periphery of the inner ring 21. In the present embodiment, the inner ring 21 and the inner ring spacer 17 are separate bodies. However, although not shown in the drawings, the inner ring 21 and the inner ring spacer 17 may be integrated with each other (i.e., may be inseparable from each other). The outer ring 22 is a cylindrical member that is fixed to an inner peripheral surface of the bearing housing 8, and a raceway (hereinafter referred to as an outer ring raceway 26) is provided on an inner periphery of the outer ring 22. As described previously (although not shown in the drawing), in the case of the configuration in which the oil supply unit 40 is a body separate from the annular outer ring spacer, and is provided on the inner side of the annular outer ring spacer in the radial direction, the outer ring spacer and the outer ring 22 may be integrated with each other (i.e., may be inseparable from each other).

The balls 23 are interposed between the inner ring 21 and the outer ring 22, and roll on the inner ring raceway 25 and the outer ring raceway 26. The cage 24 is annular, and a plurality of pockets 27 are provided along a circumferential direction thereof. The balls 23 and the cage 24 are provided in an annular space 11 that is formed between the inner ring 21 and the outer ring 22.

The cage 24 is annular as a whole, and has an annular portion 28a on the first side of the balls 23 in the axial direction, an annular portion 28b on the other side (hereinafter, referred to as "second side") of the balls 23 in the axial direction, and a plurality of bar portions 29 that couple the annular portion 28a and the annular portion 28b to each other. Each of the pockets 27 is located between the annular portions 28a and 28b, and between the bar portions 29 that are adjacent to each other in the circumferential direction. One of the balls 23 is accommodated in each of the pockets 27. Due to the configuration, the cage 24 can retain the plurality of balls 23 apart from each other in the circumferential direction.

In the cage 24, the annular portion 28a on the first side (i.e., on the oil supply unit 40-side) in the axial direction is configured to be in sliding contact with a shoulder portion 30 of the outer ring 22 via lubricating oil. Thus, the cage 24 is positioned in the radial direction by the outer ring 22. That is, the bearing portion 20 is a bearing in which the cage 24 is guided by the outer ring (i.e., guided by a raceway ring). In the present embodiment, an outer peripheral surface of the annular portion 28a is a guide surface 31 that is configured to be in sliding contact with an inner peripheral surface 30a of the shoulder portion 30. Thus, the cage 24 has the guide surface 31 that is configured to be in sliding contact with a part (the shoulder portion 30) of the outer ring 22 as the fixed ring via lubricating oil. A space between the guide surface 31 of the cage 24 and the shoulder portion 30 of the outer ring 22 will be referred to hereinafter as a sliding contact portion 15. The cage 24 is made of resin (e.g., made of phenol resin), and the inner ring 21 and the outer ring 22 are made of steel such as bearing steel or the like. The balls 23 may be made of steel such as bearing steel or the like, or may be made of ceramics.

Figure 2:
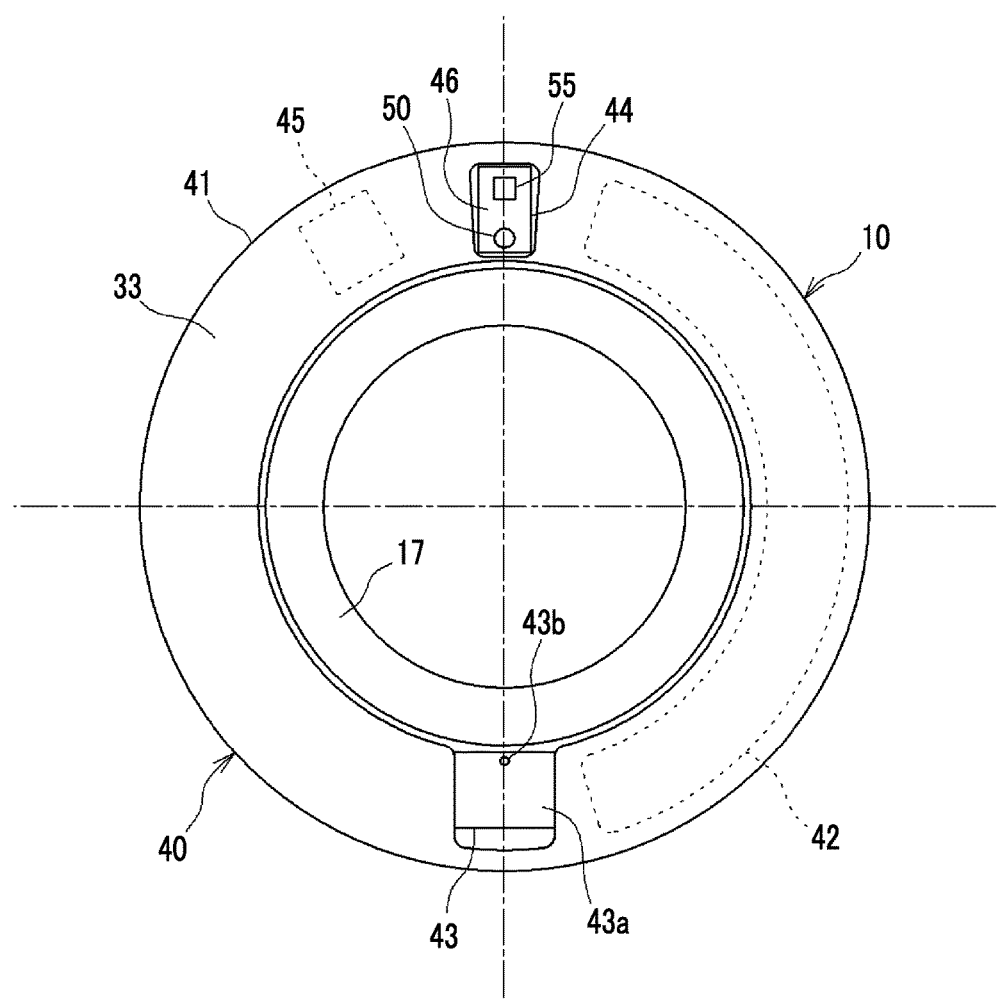
FIG. 2 is a view of an oil supply unit seen in an axial direction.

FIG. 2 is a view of the oil supply unit 40 seen in the axial direction (a view as seen in the direction indicated by an arrow A in FIG. 1). The oil supply unit 40 has an annular shape as a whole. The oil supply unit 40 according to the present embodiment includes an annular body portion 41, a tank 42, a pump 43, a vibration sensor 55, a temperature sensor 50, a control unit 44 and a power supply unit 45.

Figure 5:
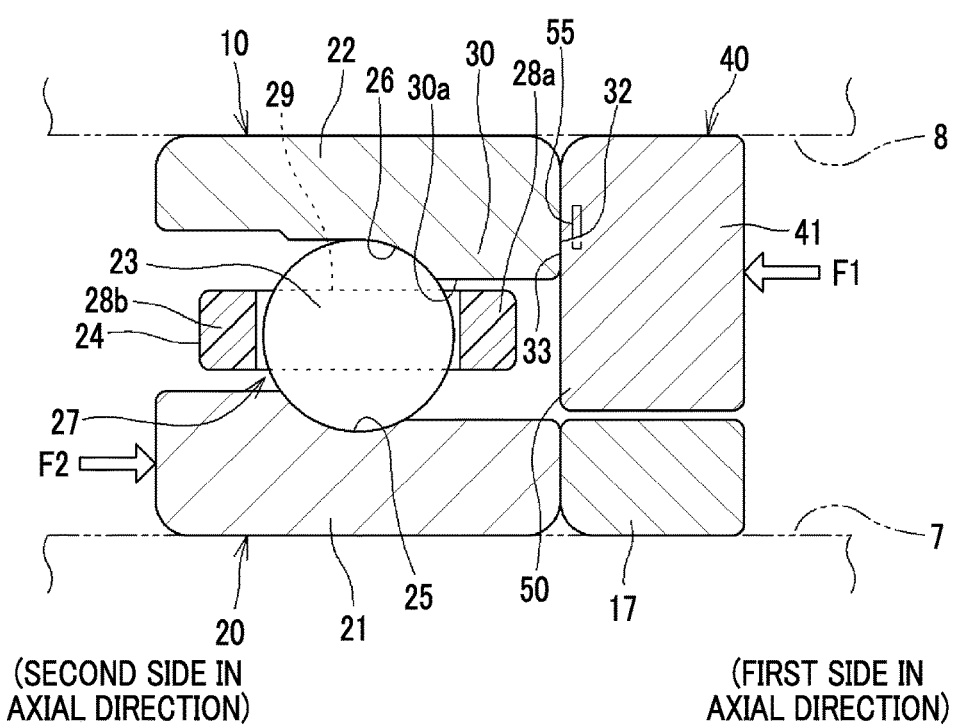
FIG. 5 is a sectional view of the bearing device.

The body portion 41 is, for example, an annular member made of metal, and functions as an outer ring spacer that receives pressure. That is, pressure in the axial direction is applied to the outer ring spacer (the body portion 41) and the outer ring 22. As shown in FIG. 5, due to the preload, an axial load (indicated by an arrow F1) acting from the first side in the axial direction toward the second side in the axial direction is applied to the outer ring spacer (the body portion 41) and the outer ring 22, and the outer ring spacer (the body portion 41) presses the outer ring 22 in the axial direction.

As shown in FIG. 2, the body portion 41 also has a function of a frame that accommodates (holds) the pump 43, the sensors 55 and 50, and the like. In other words, a hollow space is provided in the body portion 41. The tank 42, the pump 43, the vibration sensor 55, the temperature sensor 50, the control unit 44 and the power supply unit 45 are provided in the hollow space. Thus, the oil supply unit 40, which includes the body portion 41, the tank 42, the pump 43, the vibration sensor 55, the temperature sensor 50, the control unit 44 and the power supply unit 45, is configured as an integral unit. The vibration sensor 55, the temperature sensor 50 and the control unit 44 can be provided on a single substrate 46. Although not shown in the drawings, the body portion 41 includes an outer cylinder member that is made of metal and that functions as an outer ring spacer receiving pressure, and an inner cylinder member that is made of resin and that is attached to an inner peripheral side of the outer cylinder member. The hollow space may be provided in the inner cylinder member. In this case, it is preferable that the vibration sensor 55 should be fixed to the outer cylinder member via an attachment portion 61 made of metal (see FIG. 6).

In FIG. 2, the tank 42 stores lubricating oil, and communicates with the pump 43 through a flow passage such that lubricating oil is supplied to the pump 43. A holding body (e.g., a felt or a sponge) that holds lubricating oil may be provided in the tank 42. The pump 43 includes a piezoelectric element 43a therein. The piezoelectric element 43a operates so as to change the volume of an inner space of the pump 43, thereby injecting the lubricating oil in the inner space from a nozzle 43b to the annular space 11 (see FIG. 1). Thus, the pump 43 can supply lubricating oil to the bearing portion 20. When the pump 43 operates once, several picoliters to several nanoliters of lubricating oil is injected. The power supply unit 45 supplies electric power for operating the pump 43, the vibration sensor 55 and the temperature sensor 50.

The vibration sensor 55 is an acceleration sensor, and detects the vibration of the outer ring 22 as the fixed ring. In the present embodiment, the vibration sensor 55 is provided on a substrate 46, and the substrate 46 is fixed to the body portion 41. Thus, the vibration sensor 55 is configured to detect the vibration of the outer ring 22 through the body portion 41 and the substrate 46. The outer ring 22 and the body portion 41 are in close contact with each other due to pressure in the axial direction. Therefore, although the outer ring 22 and the body portion 41 are separate bodies, the vibration sensor 55 can detect the vibration of the outer ring 22.

Figure 6:
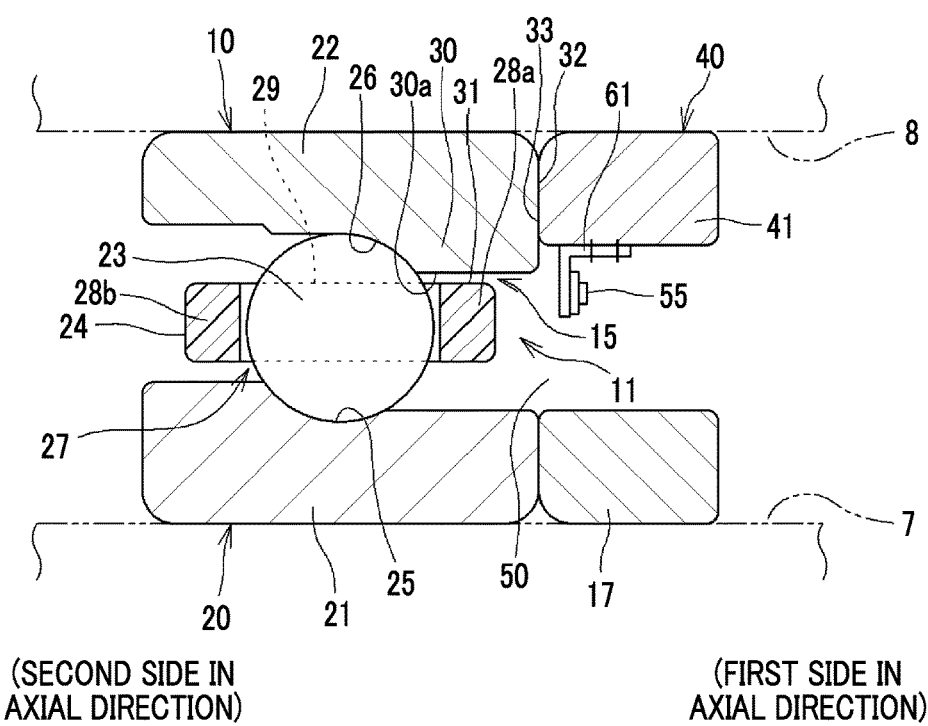
FIG. 6 is a sectional view of the bearing device.

It is preferable that the vibration sensor 55 should be fixed to the body portion 41, which functions as an outer ring spacer, via the attachment portion 61 as shown in FIG. 6. The attachment portion 61 according to the present embodiment is a jig that is a member separate from the body portion 41. The jig (the attachment portion 61) is fixed to the body portion 41 by a small screw (not shown). The vibration sensor 55 (the substrate for the vibration sensor 55) is fixed to the jig (the attachment portion 61) by a small screw (not shown). The attachment portion 61 may be a part of the body portion 41 instead of being a member separate from the body portion 41.

In the configuration shown in FIG. 6, the oil supply unit 40 includes the body portion 41 that is provided adjacent to the outer ring 22, the body portion 41 serving as the spacer (the outer ring spacer). The body portion 41 is provided with the attachment portion 61. The vibration sensor 55 is attached to the body portion 41 via the attachment portion 61. In addition, the attachment portion 61 and the body portion 41 are made of metal (steel), and the outer ring 22 is also made of metal (steel). In the configuration shown in FIG. 6, the vibration sensor 55 detects the vibration of the outer ring 22 as described previously. Metal exhibits lower vibration damping properties than resin, and therefore, the vibration that is transmitted from the outer ring 22 to the vibration sensor 55 is unlikely to be damped, and the accuracy of detection by the vibration sensor 55 can be enhanced.

In FIGS. 1 and 2, the temperature sensor 50 is an infrared sensor (a radiation thermometer). The balls 23 are in rolling contact with the inner ring raceway 25 and the outer ring raceway 26, and in sliding contact with the pockets 27 of the cage 24. Therefore, the temperature of the balls 23 is likely to rise. Thus, in the present embodiment (see FIG. 1), a detection region of the temperature sensor 50 is set in a region through which the balls 23 pass. The temperature sensor 50 measures a temperature (an average temperature) of surfaces of the balls 23 passing through the detection region. As described hitherto, the temperature sensor 50 detects a temperature of a portion of the bearing portion 20 other than the sliding contact portion 15. In other words, the temperature sensor 50 detects the temperature of the portion different from the portion whose vibration is detected by the vibration sensor 55.

Figure 3:
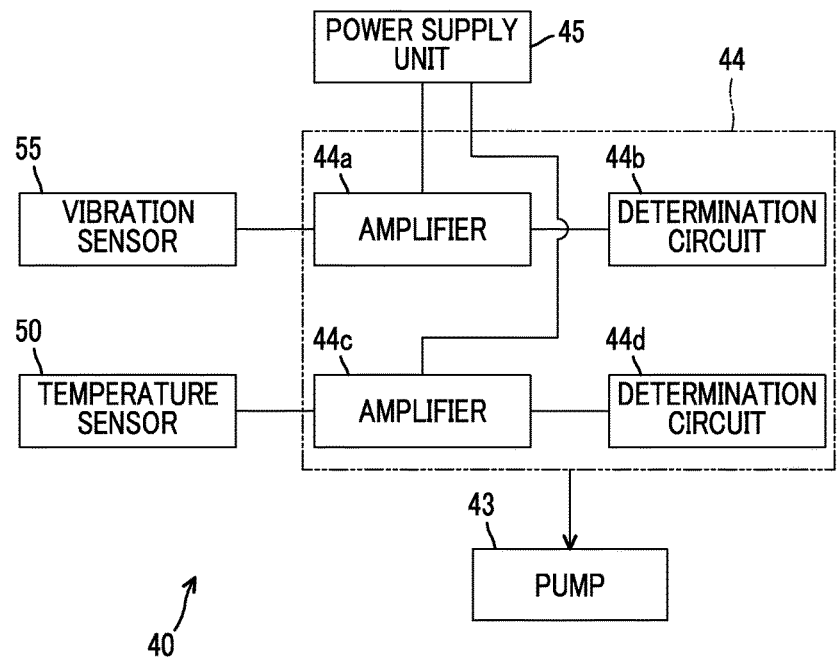
FIG. 3 is a block diagram illustrating the oil supply unit.

FIG. 3 is a block diagram illustrating the oil supply unit 40. The control unit 44 is constituted by a substrate circuit including a programmed microcomputer, an arithmetic circuit and the like, and acquires detection signals that are output from the vibration sensor 55 and the temperature sensor 50. The control unit 44 includes an amplifier 44a that amplifies an output (a detection signal) of the vibration sensor 55, and a first determination circuit 44b that carries out a determination process based on the amplified signal. Furthermore, the control unit 44 includes an amplifier 44c that amplifies an output (a detection signal) of the temperature sensor 50, and a second determination circuit 44d that carries out calculation of a temperature gradient and a determination process.

The control unit 44 supplies a control signal to the pump 43. The control unit 44 supplies a driving electric power (applies a prescribed voltage) to the piezoelectric element 43a of the pump 43 (see FIG. 2), as the control signal. The pump 43 according to the present embodiment is configured to discharge a given amount (a minute amount) of lubricating oil upon receiving the control signal (the drive voltage). The control unit 44 outputs a control signal to the pump 43 in a given cycle. The cycle is set to be constant in normal times (i.e., in a good lubrication state). However, as will be described later, the cycle is changed when a prescribed condition is fulfilled.

The oil supply unit 40 configured as described above can prevent occurrence of seizure and the like at the sliding contact portion 15 between the shoulder portion 30 of the outer ring 22 and the annular portion 28a of the cage 24, between the balls 23 and the inner and outer ring raceways 25 and 26, and between the balls 23 and the pockets 27 of the cage 24, in the bearing portion 20 (see FIG. 1). The control that is performed by the control unit 44 for this purpose will be described hereinafter.

Figure 4:
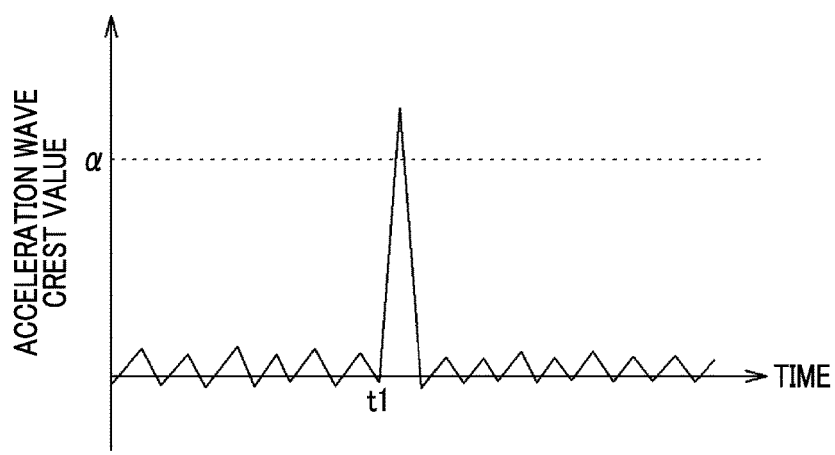
FIG. 4 is a graph showing how a detection signal output from a vibration sensor changes with time.

FIG. 4 is a graph showing how a detection signal (a first detection signal) output from the vibration sensor 55 changes with time. The vibration sensor 55 is an accelerator sensor as described previously, and therefore, an acceleration (an acceleration wave crest value) is acquired as the first detection signal. In a state where a film is formed by lubricating oil at the sliding contact portion 15 (i.e., a good lubrication state), the level of the acceleration that is obtained as the first detection signal is low, namely, vibrations of the outer ring 22 are small (before a time t1 in FIG. 4). However, when the film of lubricating oil breaks at the sliding contact portion 15, the level of the acceleration that is obtained as the first detection signal becomes high (at the time t1). When a shortage of oil occurs at the sliding contact portion 15 in this manner, a spike vibration waveform (a peak waveform) is generated in the outer ring 22. The reason for this is presumed as follows. In the case where an appropriate oil film is formed at the sliding contact portion 15, sliding occurs between the shoulder portion 30 of the outer ring 22 and the guide surface 31 of the cage 24, and the outer ring 22 hardly vibrates. However, when the oil film breaks at the sliding contact portion 15 (when a shortage of oil occurs), the guide surface 31 directly interferes with (collides with) the shoulder portion 30, and a relatively large vibration occurs at the outer ring 22. Thus, the vibration is detected by the vibration sensor 55.

When the bearing portion 20 rotates, the first determination circuit 44b (see FIG. 3) of the control unit 44 sequentially acquires the first detection signal (the acceleration signal) of the vibration sensor 55, and carries out a process of comparing the level of the first detection signal with a prescribed threshold $\alpha$ (first threshold). When this level is higher than the threshold $\alpha$ (this condition will be referred to hereinafter as a first condition), the control unit 44 outputs a control signal for decreasing the cycle of discharge of lubricating oil by the pump 43 (i.e., a control signal for making the cycle short). For example, when the first condition is fulfilled as a result of the comparison, the control unit 44 then outputs a control signal to the pump 43, and causes the pump 43 to discharge lubricating oil therefrom. Furthermore, the control unit 44 decreases the cycle of the control signal output to the pump 43. Thus, a shortage of oil is eliminated. The process of the comparison can be realized by providing the control unit 44 with, for example, the function of a comparator.

Figure 8:
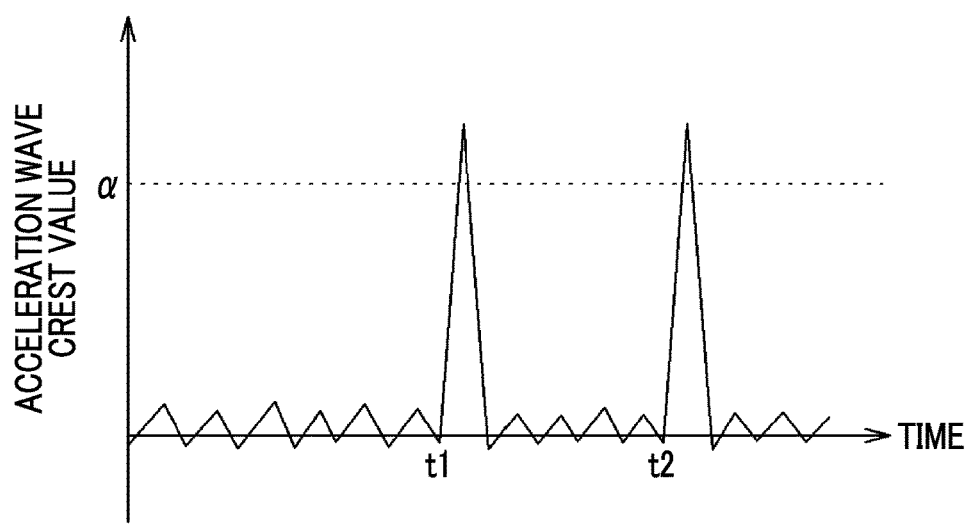
FIG. 8 is a graph showing how the detection signal output from the vibration sensor changes with time.

As described previously, the condition for outputting the control signal to the pump 43 may be fulfilled when the level of the first detection signal becomes higher than the threshold $\alpha$ once as a result of the comparison (see FIG. 4). Alternatively, however, as shown in FIG. 8, this condition may be fulfilled when the level of the first detection signal becomes higher than the threshold $\alpha$ a plurality of times. In this case, the control unit 44 has the function of a counter. In other words, in FIG. 8, the control unit 44 may not output a control signal even when the level of the first detection signal becomes higher than the threshold $\alpha$ once (at the time t1), and the control unit 44 may output a control signal after it is detected twice (a plurality of times) that the level of the first detection signal has become higher than the threshold $\alpha$ (at a time t2). Thus, when the level of the first detection signal becomes higher than the threshold $\alpha$ once due to noise, no control signal is output. Thus, it is possible to enhance the reliability in detecting a poor lubrication state.

As described hitherto, the control unit 44 can compare the level of the detection signal of the vibration sensor 55 with the threshold $\alpha$. When the level is higher than the threshold $\alpha$ as a result of this comparison, the control unit 44 can output the control signal for causing the pump 43 to supply lubricating oil.

As described above, the pump 43 may be controlled based on only the first detection signal of the vibration sensor 55.

In the present embodiment, however, the pump 43 is controlled by further using a second detection signal of the temperature sensor 50. That is, the second determination circuit 44*d* (see FIG. 3) of the control unit 44 sequentially acquires the detection signal (the second detection signal) of the temperature sensor 50, namely, a temperature signal as well, and carries out a process of comparing a level of a change in the temperature with time (i.e., a temperature gradient) based on the detection signal, with a prescribed threshold (second threshold). Then, when this level is higher than the prescribed threshold (this condition will be referred to hereinafter as a second condition), the control unit 44 can output a control signal for decreasing the cycle of discharge of lubricating oil by the pump 43 (i.e., a control signal for making the cycle short).

In the present embodiment, the control unit 44 is configured to output the control signal for causing the pump 43 to supply lubricating oil by using two conditions, namely, the first condition and the second condition in each case. That is, control of making the discharge cycle short with respect to a prescribed value (i.e., control of making the discharge cycle shorter than a prescribed value) is performed when only one of the first condition and the second condition is fulfilled, and control of making the discharge cycle still shorter than the prescribed value is performed when both the first condition and the second condition are fulfilled. More specifically, the pump 43 is operated at 1 Hz when neither the first condition nor the second condition is fulfilled, namely, in normal times (i.e., in a good lubrication state). However, the pump 43 is operated at 10 Hz when only one of the first condition and the second condition is fulfilled, and the pump 43 is operated at 100 Hz when both the first condition and the second condition are fulfilled.

When a shortage of oil occurs at the bearing portion 20, an acceleration wave crest value in the form of a spike as described previously (see FIG. 4) often appears before the temperature detected by the temperature sensor 50 tends to rise rapidly. Accordingly, when the first condition is fulfilled, the control of making the discharge cycle short with respect to the prescribed value is performed. Furthermore, when the second condition is fulfilled afterward, the control of making the discharge cycle still shorter than the prescribed value is performed.

Thus, the bearing device 10 according to the present embodiment (see FIG. 1) is configured such that the cage 24 is positioned by the outer ring 22 through sliding contact of the guide surface 31 of the cage 24 with the shoulder portion 30 of the outer ring 22 via lubricating oil. Accordingly, heat is likely to be generated at the sliding contact portion 15 between the guide surface 31 of the cage 24 and the shoulder portion 30 of the outer ring 22. When a shortage of oil (and a sign thereof) occurs due to, for example, exhaustion of lubricating oil at the sliding contact portion 15, the state of contact between the guide surface 31 and the shoulder portion 30 changes, and the change appears as the vibration of the outer ring 22. Thus, the vibration sensor 55 detects the vibration. Thus, a shortage of oil (and an indication of a shortage of oil) at the bearing portion 20 (the sliding contact portion 15) can be detected based on the vibration of the outer ring 22. That is, the lubrication state at the bearing portion 20 can be detected by the vibration sensor 55.

Even if a rise in the temperature of the sliding contact portion 15 is detected when a shortage of oil occurs at the sliding contact portion 15, it is difficult to directly detect the rise in the temperature, because the gap between the shoulder portion 30 and the guide surface 31 of the cage 24 is extremely small. In other words, because it is difficult to directly detect the temperature of the space between the guide surface 31 and the shoulder portion 30 by the temperature sensor, the temperature sensor detects a temperature of a lateral surface of the cage 24 in the axial direction to which the heat generated between the guide surface 31 and the shoulder portion 30 has been transmitted. In this case, however, a shortage of oil at the sliding contact portion 15 (a rise in the temperature resulting therefrom) is indirectly detected, and therefore, responsiveness and accuracy of this detection may be insufficient. Thus, in the present embodiment, the vibration resulting from a change in the state of contact between the guide surface 31 and the shoulder portion 30 caused by a shortage of oil is detected by the vibration sensor 55. Therefore, the responsiveness and accuracy of the detection are high, and it is possible to enhance the reliability in detecting a shortage of oil (and an indication of a shortage of oil), namely, detecting a lubrication state at the bearing portion 20.

As described previously, in the present embodiment, an acceleration wave crest value in the form of a spike as shown in FIG. 4 is detected by the vibration sensor 55 based on the finding that this wave crest value appears before the temperature tends to rise rapidly when a shortage of oil occurs at the bearing portion 20. Therefore, a shortage of oil (and an indication of a shortage of oil) can be detected at an early stage.

Then, when the amount of lubricating oil at the bearing portion 20 decreases due to, for example, exhaustion or the like, the temperature inside the bearing rises. Thus, this rise in the temperature is detected by the temperature sensor 50, and thus, a decrease in the amount of lubricating oil is detected. The temperature sensor 50 is provided to detect a temperature of a portion (the balls 23) other than the sliding contact portion 15. Therefore, in cooperation with the vibration sensor 55, the temperature sensor 50 can further enhance h reliability in detecting a lubrication state at the bearing portion 20.

As described hitherto, the oil supply unit 40 includes both the vibration sensor 55 and the temperature sensor 50. Therefore, the control unit 44 can determine whether the first detection signal of the vibration sensor 55 fulfills the first condition (a prescribed first condition), and determines whether the second detection signal of the temperature sensor 50 fulfills the second condition (a prescribed second condition). Then, when one of the first condition and the second condition is fulfilled, the control unit 44 outputs the control signal for causing the pump 43 to supply lubricating oil. In the present embodiment, the signal for decreasing the cycle of discharge of lubricating oil from the pump 43 is output as the control signal. As described above, a lubrication state at the bearing portion 20 can be doubly detected, and the reliability of detection can be further enhanced.

Figure 7:
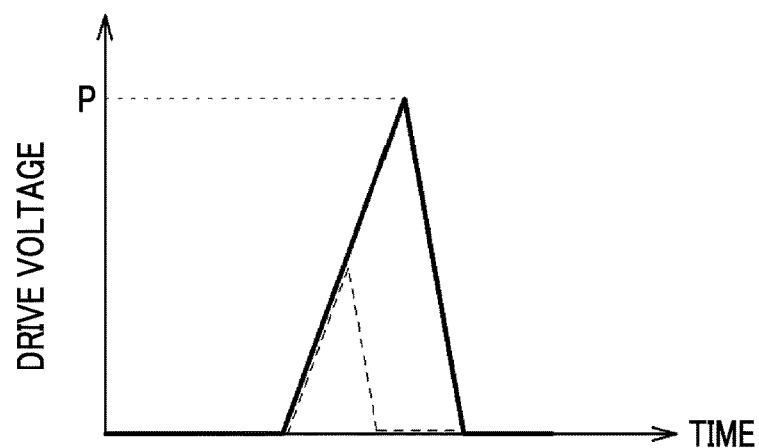
FIG. 7 is an illustrative view of a drive voltage that is applied to a piezoelectric element of a pump.

In the foregoing embodiment, the control unit 44 can supply a driving electric power (i.e., can apply a prescribed voltage) to the piezoelectric element 43*a* (see FIG. 2) of the pump 43 as the control signal and further changes (decreases) the cycle of supplying this drive voltage in accordance with the result(s) of detection performed by the vibration sensor 55 (and/or the temperature sensor 50). However, the control unit 44 may perform control other than this. That is, the control unit 44 may supply, as the control signal, a driving electric power (apply a prescribed voltage) to the piezoelectric element 43*a* of the pump 43 (see FIG. 2) as in the foregoing embodiment, and may further perform control of changing the magnitude of the drive voltage in accordance with the result(s) of detection performed by the vibration sensor 55 (and/or the temperature sensor 50) (i.e., upon fulfillment of the first condition and/or the second condition). That is, the displacement amount (the operation amount) of the piezoelectric element 43a is increased by increasing a drive voltage P (see FIG. 7) supplied to the piezoelectric element 43a. In FIG. 7, a waveform of the drive voltage before being changed is indicated by a broken line, and a waveform of the changed drive voltage is indicated by a solid line. By increasing the displacement amount of the piezoelectric element 43a in this manner, the change in the volume of an inner space of the pump 43 can be increased, and the amount of lubricating oil that is discharged each time can be increased. As a result, as in the case where the cycle of supplying the drive voltage is decreased (i.e., the cycle is made short), the amount of lubricating oil supplied for a given time period can be increased.

In this case as well, the control unit 44 may output a control signal for causing the pump 43 to supply lubricating oil by using two conditions, namely, the first condition and the second condition in each case. In other words, control may be performed to output a control signal for increasing the drive voltage supplied to the piezoelectric element 43a when only one of the first condition and the second condition is fulfilled, and to output a control signal for further increasing the drive voltage when both the first condition and the second condition are fulfilled.

The control unit 44 may perform control of raising the temperature of lubricating oil to be discharged, in accordance with the result(s) of detection performed by the vibration sensor 55 (and/or the temperature sensor 50), as another control for increasing the amount of lubricating oil that is discharged from the pump 43 each time. In order to perform this control, for example, the tank 42 (see FIG. 2) may be provided with a heater (not shown). That is, the control unit 44 performs control of outputting a control signal for operating the heater (i.e., control of causing a current to flow through the heater) in accordance with the result(s) of detection performed by the vibration sensor 55 (and/or the temperature sensor 50) (i.e., upon fulfillment of the first condition and/or the second condition). When the temperature of lubricating oil is raised by the heater, the viscosity of lubricating oil decreases. Therefore, even when the driving force of the pump 43 is constant, the discharge amount increases. Thus, the amount of lubricating oil supplied for a given time period can be increased. After that, the operation of the heater is stopped, and the discharge amount returns to an original amount due to natural cooling.

In the bearing portion 20 according to the present embodiment, as described previously (see FIGS. 1 and 6), the guide surface 31 of the cage 24 is configured to be in sliding contact with the shoulder portion 30 in the first side of the outer ring 22 in the axial direction, via lubricating oil. The oil supply unit 40 is provided on the first side of the bearing portion 20 in the axial direction where the shoulder portion 30 is present such that the oil supply unit 40 is adjacent to the bearing portion 20. The vibration sensor 55 is closer to the outer ring 22 in the radial direction (i.e., the vibration sensor 55 is closer to the outer ring 22 than to the inner ring 21 in the radial direction). In other words, the vibration sensor 55 is provided at a position close to the shoulder portion 30 with which the cage 24 is in contact, in the axial direction, and is provided at a position that is closer to the outer ring 22 than to the inner ring 21 in the radial direction. Therefore, the sensitivity in detection of the vibration of the outer ring 22 by the vibration sensor 55 can be enhanced.

FIG. 5 is a sectional view of the hearing device 10 (a view along a sectional surface different from that of FIG. 1). As described previously, the bearing device 10 is used with pressure applied thereto in the axial direction. In FIG. 5, directions of forces for applying the preload are indicated by arrows F1 and F2. In other words, the body portion 41 of the oil supply unit 40 presses the outer ring 22 of the bearing portion 20 from the first side in the axial direction toward the second side in the axial direction, and the inner ring 21 of the bearing portion 20 is pressed from the second side in the axial direction toward the first side in the axial direction. Thus, pressure in the axial direction is applied to the bearing portion 20.

Thus, in the bearing device 10 according to the present embodiment, as described previously, the outer ring 22 includes the outer ring raceway 26 with which the balls 23 are in rolling contact, and the shoulder portion 30 that is located on the first side of the outer ring raceway 26 in the axial direction. The oil supply unit 40 includes the body portion 41 that is provided adjacent to the first side of the outer ring 22 in the axial direction, the body portion 41 serving as a spacer. The vibration sensor 55 is mounted at the spacer (the body portion 41). In the case of the configuration shown in FIG. 6, the vibration sensor 55 is mounted at the attachment portion 61 that is provided at the spacer (the body portion 41). The spacer (the body portion 41) has a contact surface 33 (see FIGS. 2, 5 and 6) in the second side in the axial direction. The contact surface 33 comes into surface contact with a lateral surface 32 of the shoulder portion 30 on the first side in the axial direction and presses the lateral surface 32 when pressure in the axial direction is applied to the spacer (the body portion 41) and the bearing portion 20. Due to the configuration, although the outer ring 22 and the spacer (the body portion 41) are separate bodies, the vibration of the outer ring 22 is accurately transmitted to the spacer (the body portion 41) through application of pressure, and the sensitivity in detection of the vibration of the outer ring 22 by the vibration sensor 55 is enhanced.

As described above, the bearing device 10 according to the present embodiment makes it possible to detect a lubrication state at the bearing portion 20, and to effectively prevent occurrence of seizure and the like at the bearing portion 20 by enhancing the reliability in this detection.

In the bearing device 10 (see FIG. 1) according to the present embodiment, the tank 42 (see FIG. 2) is provided in a small space of the oil supply unit 40, and therefore, the capacity of the tank 42 is limited. When the amount of consumed lubricating oil increases in spite of the limited capacity of the tank 42, it becomes necessary to frequently replenish the tank 42 with lubricating oil, and the device (the machine tool) needs to be stopped every time maintenance of replenishing the tank 42 with lubricating oil is carried out. As a result, the operation efficiency (the production efficiency) decreases. However, in the bearing device 10 according to the present embodiment, when a spike waveform (see FIGS. 4 and 8) that is generated in the outer ring 22 is detected by the vibration sensor 55, it is determined that there is a shortage of oil (or an indication of a shortage of oil), and a large amount of oil is supplied from the pump 43. Accordingly, the supply of oil is not carried out unnecessarily, and therefore, the amount of consumed lubricating oil can be reduced. Therefore, there is no need to frequently carry out maintenance of replenishing the tank 42 with lubricating oil, and a substantially maintenance-free operation can be performed in some cases.

The embodiment disclosed hereinabove is exemplary and nonrestrictive in all respects. In other words, the bearing device according to the disclosure is not limited to the configurations shown in the drawings, and the bearing device according to the disclosure may have other configurations within the scope of the disclosure.

For example, the cage 24 may have configurations other than the configuration shown in the drawings. The cage 24 may be configured to be in sliding contact with a part of the inner peripheral surface of the outer ring 22. In the configuration shown in FIG. 1, a guide portion configured to be in sliding contact with the outer ring 22 is a surface (the guide surface 31). However, the guide portion may be a protruding portion. The object with which the cage 24 is in sliding contact may be the inner peripheral surface of the outer ring 22 other than the inner peripheral surface 30a of the shoulder portion 30, and may be a part of the outer ring raceway 26 (note that this part does not include points of contact with the balls 23). Although not shown in the drawings, the cage 24 may be configured such that the annular portion is provided only on the first side (i.e., on the oil supply unit 40-side) of the balls 23 in the axial direction (i.e., the cage 24 may be configured as a so-called crown cage).

In the foregoing embodiment, the outer ring 22 is a fixed ring and the outer ring 22 positions the cage 24 in the radial direction, but the opposite configuration may be employed. That is, the inner ring 21 may be a fixed ring and the inner ring 21 may position the cage 24 in the radial direction. In this case, the vibration sensor 55 detects the vibration of the inner ring 21. That is, in the bearing portion 20, one of the inner ring 21 and the outer ring 22 may be a rotational ring, and the other of the inner ring 21 and the outer ring 22 may be a fixed ring. The cage 24 may include a guide portion configured to be in sliding contact with a part of a fixed ring via lubricating oil, and the vibration sensor 55 may detect the vibration of the fixed ring.

The bearing portion 20 shown in FIG. 1 is an angular ball bearing, but the bearing is not limited to the angular ball bearing. The bearing portion 20 may be a deep groove ball bearing. The bearing portion 20 may be a tapered roller bearing, a cylindrical roller bearing or the like that has rollers as rolling elements.

In the foregoing embodiment, the oil supply unit 40 includes the control unit 44 and the power supply unit 45. However, the control unit 44 and the power supply unit 45 may be installed outside the oil supply unit 40, namely, outside the bearing device 10. In this case, the oil supply unit 40 and the outside are connected to each other through a signal line or a power line.

In the foregoing embodiment, the configuration in which the pump discharges lubricating oil in a given cycle has been described as a premise, but the disclosure is not limited thereto. In other words, the pump may be configured to discharge lubricating oil every time it is determined, from result(s) of detection performed by the vibration sensor and/or the temperature sensor, that there is a situation where lubricating oil is needed inside the bearing, even when the pump does not periodically discharge lubricating oil. The frequency with which the pump discharges lubricating oil may be increased in accordance with the detection result(s). The amount of lubricating oil that is discharged every time the pump operates may be increased in accordance with the detection result(s).

What is claimed is:

1. A bearing device comprising:
    a bearing portion that includes an inner ring, an outer ring, a plurality of rolling elements that are interposed between the inner ring and the outer ring, and a cage that holds the plurality of rolling elements, one of the inner ring and the outer ring being a rotational ring, and another of the inner ring and the outer ring being a fixed ring; and
    an oil supply unit that is provided adjacent to the bearing portion in an axial direction, wherein
    the cage includes a guide portion that is configured to be in sliding contact with a part of the fixed ring via lubricating oil,
    the oil supply unit includes a vibration sensor configured to detect a vibration of the fixed ring, and a pump configured to supply the lubricating oil to the bearing portion,
    the guide portion of the cage is configured to be in sliding contact with the part of the fixed ring on one side of the bearing portion in the axial direction, via the lubricating oil,
    the oil supply unit is provided on the one side of the bearing portion in the axial direction,
    the vibration sensor is provided closer to the fixed ring than to the rotational ring in a radial direction,
    the fixed ring has an end surface at the one side of the bearing portion in the axial direction, and
    the vibration sensor faces the end surface of the fixed ring in the axial direction.

2. The bearing device according to claim 1, further comprising
    a control unit that is configured to make a comparison between a level of a detection signal of the vibration sensor and a threshold, and to output a control signal for causing the pump to supply the lubricating oil when the level is higher than the threshold as a result of the comparison.

3. The bearing device according to claim 1, wherein the oil supply unit further includes a temperature sensor configured to detect a temperature of a portion of the bearing portion other than a sliding contact portion between the part of the fixed ring and the guide portion.

4. The bearing device according to claim 3, further comprising
    a control unit that is configured to determine whether a first detection signal of the vibration sensor fulfills a prescribed first condition, to determine whether a second detection signal of the temperature sensor fulfills a prescribed second condition, and to output a control signal for causing the pump to supply the lubricating oil when one of the prescribed first condition and the prescribed second condition is fulfilled.

5. The bearing device according to claim 4, wherein:
    the prescribed first condition is a condition that a level of the first detection signal is higher than a first threshold; and
    the prescribed second condition is a condition that a level of a change in the temperature with time based on the second detection signal is higher than a second threshold.

6. The bearing device according to claim 1, wherein:
    the fixed ring includes a raceway with which the plurality of rolling elements are in rolling contact, and a shoulder portion that is located, as the part of the fixed ring, on one side of the raceway in the axial direction;
    the oil supply unit includes an annular spacer that is provided adjacent to a part of the fixed ring on the one side of the bearing portion in the axial direction, the vibration sensor being mounted at the annular spacer; and
    the spacer has a contact surface that contacts the end surface of the shoulder portion on the one side of the bearing portion in the axial direction and presses the end surface when pressure in the axial direction is applied to the spacer and the bearing portion.

7. The bearing device according to claim 6, wherein the spacer is made of metal.

8. The bearing device according to claim 1, wherein:
the oil supply unit includes a spacer that is made of metal, the spacer being provided adjacent to the fixed ring; and the vibration sensor is attached to the spacer via an attachment portion made of metal, the attachment portion being provided at the spacer.

* * * * *